United States Patent [19]

Brady et al.

[11] Patent Number: 5,404,893

[45] Date of Patent: Apr. 11, 1995

[54] SELF-OPTIMIZING DETERGENT CONTROLLER

[75] Inventors: Daniel F. Brady, Eagan; John E. McCall, Jr., West St. Paul; Clyde A. Bailey, Hastings; James L. Copeland, Burnsville, all of Minn.

[73] Assignee: Ecolab Inc., St. Paul, Minn.

[21] Appl. No.: 849,750

[22] Filed: Mar. 12, 1992

[51] Int. Cl.⁶ .............................................. B08B 7/04
[52] U.S. Cl. ..................................... 134/18; 134/25.2; 134/56 R
[58] Field of Search .................... 134/18, 25.2, 57 D, 134/57 R, 58 D, 58 R, 56 D, 56 R; 68/12.18, 12.02; 222/651

[56] References Cited

U.S. PATENT DOCUMENTS

| | | | |
|---|---|---|---|
| 2,850,760 | 9/1958 | Vanderwalker | 16/163 |
| 3,154,218 | 10/1964 | Aubert | 222/70 |
| 3,203,436 | 8/1965 | Wallgren et al. | 134/58 |
| 3,402,853 | 9/1968 | Perl | 222/70 |
| 3,774,056 | 11/1973 | Sample et al. | 307/293 |
| 3,807,418 | 4/1974 | Jenkins | 134/57 D |
| 3,896,827 | 7/1975 | Robinson | 134/10 |
| 4,142,539 | 3/1979 | Shih et al. | 134/113 |
| 4,241,400 | 12/1980 | Keifer | 364/400 |
| 4,245,309 | 1/1981 | Kiefer | 364/400 |
| 4,463,582 | 8/1984 | Saalmann et al. | 134/57 D |
| 4,509,543 | 4/1985 | Livingston et al. | 134/57 D |
| 4,756,321 | 7/1988 | Livingston et al. | 134/56 D |
| 4,858,449 | 8/1989 | Lehn | 68/12.18 |
| 5,014,211 | 5/1991 | Turner et al. | 364/478 |
| 5,038,807 | 8/1991 | Baily et al. | 134/57 D |
| 5,207,080 | 5/1993 | Reinhard | 68/12.18 |
| 5,257,171 | 10/1993 | Hara | 134/57 D X |

FOREIGN PATENT DOCUMENTS

| | | |
|---|---|---|
| 68267 | 1/1983 | European Pat. Off. |
| 0229038 | 7/1987 | European Pat. Off. |
| 3314992 | 10/1984 | Germany |
| 3400495 | 7/1985 | Germany |
| 60-21118B | 5/1986 | Japan |
| 63-077493A | 4/1988 | Japan |
| 673680 | 7/1979 | U.S.S.R. |

Primary Examiner—Scott Kastler
Assistant Examiner—Saeed Chaudhry
Attorney, Agent, or Firm—Merchant, Gould, Smith, Edell, Welter & Schmidt

[57] ABSTRACT

An apparatus and method for programming a detergent controller to vary the detergent concentration set-point according to the time of day and to achieve detergent concentration levels quickly without incurring overshoot. Thus, the present invention insures that the warewashing machine is operated at optimum efficiency and cost. To vary the set-point according to the time of day, the invention combines the features of a microprocessor, a clock and a controller into one unit. The user enters the time setting and set point into the controller. The microprocessor then compares the real-time clock signal with the user time settings and outputs an appropriate set-point value from the microprocessor to the controller. To achieve detergent concentration levels quickly without incurring overshoot, the controller senses the detergent concentration and dispenses the proper detergent level to the warewashing machine according to a predetermined detergent feed time based on the previous response time and the programmed set-point. Thus, the controller can change the response function if and when conditions change.

11 Claims, 3 Drawing Sheets

SELF-OPTIMIZING DETERGENT CONTROLLER

BACKGROUND OF THE INVENTION

1. Field of the Invention

This invention relates primarily to a method and apparatus for controlling the automatic addition of detergent into a commercial warewashing machine. There are two key problems addressed by the invention. One is the detergent addition itself. The other is the determination of an appropriate concentration setpoint. By making the detergent feed dependent upon the real-time concentration change rate, detergent overuse is reduced during the detergent addition. Adjusting detergent concentration setpoints to correspond to changing account conditions also helps to maximize the performance of the warewashing process.

2. Description of Related Art

It is known in the art to provide warewashing machine systems with detergent controllers. Typically, such systems operate in an on-off mode, proportional mode or a combination thereof. The systems control the detergent concentration level to a pre-set detergent concentration level (set-point). The systems do not compensate for varying chemical injection rates and therefore exceed this set-point. They indirectly sense detergent concentration by measuring solution conductivity.

The major perceived benefits of this type of controller is that the addition of, and concentration maintenance of, detergent to the warewashing machine is achieved without manual intervention.

However, these controllers do have some major shortcomings. The detergent concentration set-point consists of a single pre-set value for all wash cycles. Unless the set-point is manually reset, the wash items are subjected to the same concentrations of detergent in the wash solution, regardless of the meal period or type of soil present on the wash items. Therefore, to be certain of maintaining an acceptable cleaning result, the setpoint is selected for a worst case condition. This results in detergent overuse. In addition, the detergent controllers feed detergent based on proportional control, reacting to the relationship between the setpoint and the current concentration. They do not compensate for the detergent feed rate which also causes detergent overuse or excessive wear on the feeder equipment.

SUMMARY OF THE INVENTION

To overcome the limitations in the prior art described above, and to overcome other limitations that will become apparent upon reading and understanding the present specification, the present invention discloses a programmable detergent controller for varying the detergent concentration set-point according to the date and time. The controller sensor, a conductivity sensor with an imbedded thermistor, is capable of not only detecting detergent concentration and wash temperature but also water changeovers, machine run time, and detergent consumption. The present invention also discloses a programmable detergent controller for optimizing detergent concentration without incurring overshoot. Thus, the present invention insures that the warewashing machine is operated at optimum efficiency and cost.

The present invention combines the features of a microprocessor, clock and controller into one unit. The present invention provides a controller with the ability to change detergent concentration set-points according to the time of the day. The present invention also provides a detergent controller with the ability to reach a detergent concentration level quickly without incurring overshoot.

A feature of the present invention is a controller which may be programmed with a variable detergent concentration set-point. A further feature of the present invention is a controller which senses the detergent concentration and dispenses the proper detergent amount to the warewashing machine. An advantage of the present invention is the ability to change the detergent concentration set-point to correspond to the meal period or other special needs. Another advantage of the present invention is the ability to calculate the appropriate detergent feed time based on the rate of detergent concentration change.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The preferred embodiment of the present invention provides a system to control detergent concentration setpoints for warewashing machines with respect to time. The present invention leverages the sensing capability of the detergent controller by adding a microprocessor and a clock into the controller unit. By programming different detergent concentration set-points for different times of the day, the variable detergent concentration controller can more effectively remove soil from the wash items.

The preferred embodiment of the present invention also provides a system to control the detergent concentration level without overshooting a pre-set detergent concentration level. Detergent injection rates vary with temperature, concentration and other factors. The latency time that results from the feeder equipment injection delays and product dissolution rates is not accounted for in previous detergent controllers. The present invention compensates for any latency time without exceeding the detergent concentration set-point. Those skilled in the art will recognize that the present invention could be used with any type of warewashing machine.

Figure 1:
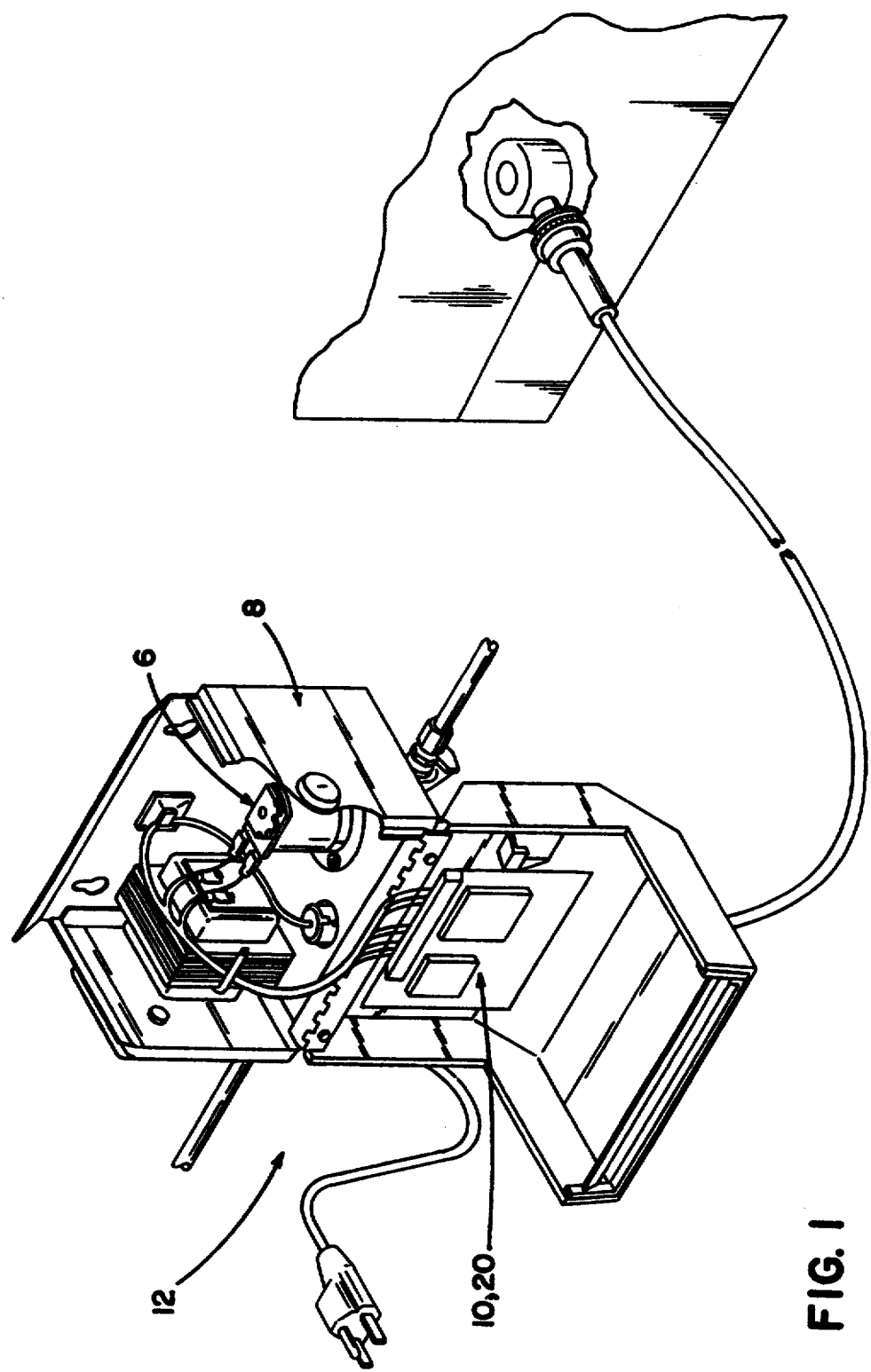
FIG. 1 is a diagram showing the interconnection between the warewashing machine and the monitoring system.

FIG. 1 discloses the preferred embodiment of the present invention as used in a typical warewashing system. The preferred embodiment includes a detergent controller 12 that incorporates a microprocessor 10 and a clock 20 within a housing unit 8. The controller 12 also includes a solenoid valve 6 within the housing unit 8 to control the detergent feed to the warewashing system.

Figure 2:
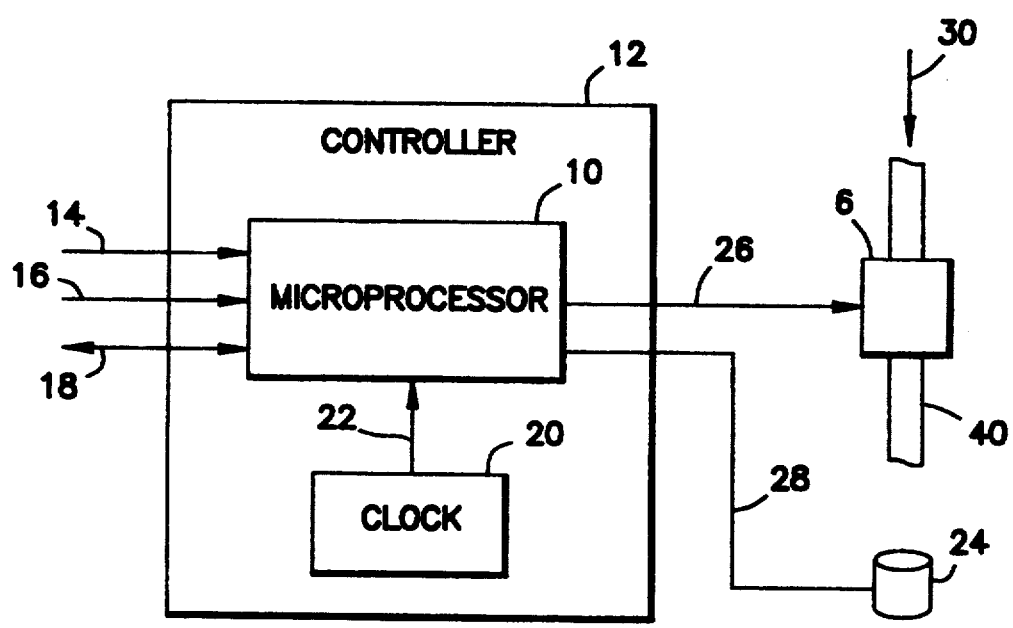
FIG. 2 is a block diagram of the variable detergent concentration set-point system incorporating a microprocessor, a clock and a detergent on-time controller.

FIG. 2 more particularly illustrates the block diagram of the preferred embodiment as used in a variable detergent concentration set-point system. The preferred embodiment includes a microprocessor 10 for determining an appropriate detergent concentration set-point. The microprocessor 10 receives two types of inputs from the user. First, a particular detergent concentration set-point 14 is entered into the microprocessor 10. Then, a user time setting 16 is entered into the microprocessor 10. The user time setting 16 instructs the microprocessor 10 to begin using the corresponding detergent concentration set-point at the time entered.

Next, the preferred embodiment includes a clock device 20 that provides the microprocessor 10 with a signal corresponding to the date and time 22. The microprocessor 10 compares the date and time signal 22 to the user time setting 16. When the clock date and time signal 22 coincides with the user time setting 16, the microprocessor 10 loads the corresponding detergent concentration set-point 14. The detergent controller 12 uses this corresponding detergent concentration set-point 14 until the microprocessor 10 determines that another set-point should be used. Thus, the controller 12 can be programmed to handle soil loads that vary cyclically with time. The number of time and set-point entries are limited only by the storage capability of the microprocessor.

A sensor 24 routes a measurement of the detergent concentration and temperature information 28 to the microprocessor 10. The sensor 24 preferably comprises a conductivity sensor and an imbedded thermistor. The conductivity sensor signals "the detergent concentration 28 by determining conductivity using the measurement of the free ions in the wash tank 40 solution. The imbedded thermistor signals the temperature information 28 by determining the temperature of the wash tank 40 solution.

In the preferred embodiment the conductivity sensor may be of an electrode or electrode-less type. An electrode-type conductivity sensor is typically comprised of two electrodes immersed in the wash tank 40 solution, wherein the current flow from one electrode to the other electrode corresponds to the conductivity of the solution. An electrode-less conductivity sensor, which operates as a transformer, is typically comprised of a primary coil inducing a current into the wash tank 40 solution and a secondary coil converting the current into a voltage level, wherein the voltage level corresponds to the conductivity of the solution.

The microprocessor 10 uses the conductivity and temperature information 28 provided by the sensor 24 to determine wash tank 40 changeover, detergent consumption, and detergent feed.

With regard to wash tank 40 changeover, the microprocessor 10 can determine when the wash tank 40 has been recharged with fresh water using the detergent concentration 28. Typically, the same solution is used over and over for multiple racks of dishes. The sensor 24 senses the fresh water because of the resulting change of the solution to a very low conductivity or a major reduction in conductivity.

With regard to detergent consumption, the detergent concentration 28 from the sensor 24 can also be used to determine when a detergent reservoir is empty. If the sensor 24 detects a decrease in conductivity, even though the warewashing machine has been instructed to feed detergent into the wash tank 40, then there is probably no detergent being fed into the wash tank 40. However, it could be the situation that someone just recharged the detergent reservoir, but some air has gotten into the feed line; it is also possible some of the detergent was solidified and it is just eroding slowly in the wash tank 40 solution; or it is possible that there are other causes of low conductivity. Thus, the microprocessor 10 can be programmed not to indicate an empty detergent reservoir unless the wash tank 40 solution remains at a low conductivity level for some period of time. Other criteria can also be used.

With regard to detergent feed, the microprocessor 10 compares the corresponding detergent concentration setpoint 14 with the detergent concentration 28 from the sensor 24. Based on this comparison, the microprocessor 10 determines when the solenoid valve 6 should be opened to allow the feeding of detergent solution 30 into the wash tank 40 and sends a open command 26 to the solenoid valve 6.

Figure 3:
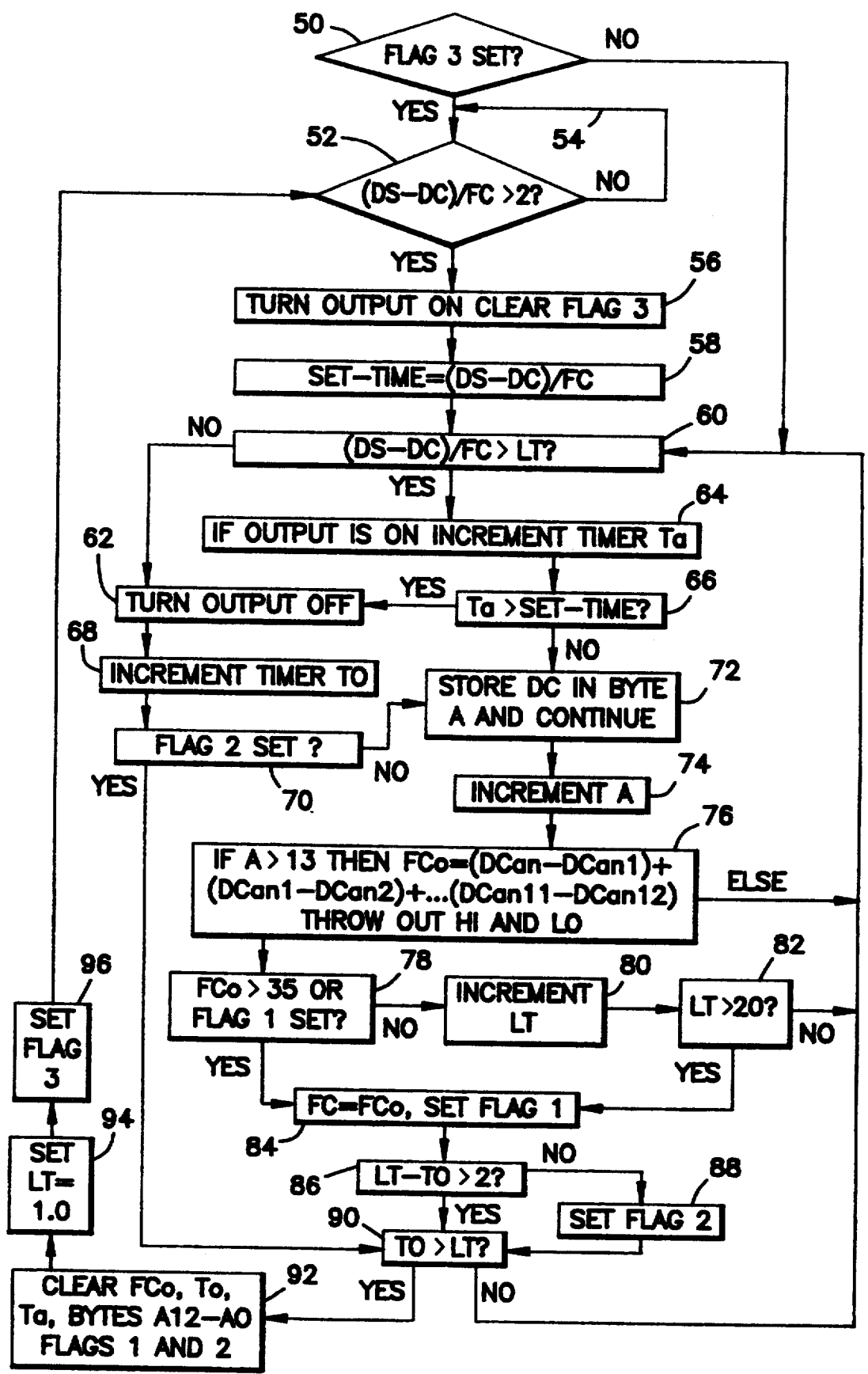
FIG. 3 is a flow chart diagram describing how the controller calculates the appropriate detergent feed time based upon the previous response and a programmed on-off set-point.

FIG. 3 is a flow chart describing the steps performed by the controller 12 (shown in FIGS. 1 and 2) during detergent feed to achieve, yet not exceed, a pre-set detergent concentration level. There must be a balance between overshoot and the need to reach a suitable detergent concentration quickly to insure adequate washing performance on the first items through the process.

Instead of fixed or adjustable crossover points to proportional mode or adjustments to output response protocols, the controller 12 dispenses detergent only by calculating the required feeder on-time, based on the last known flow-rate. After, or in some cases during a detergent feed cycle, the detergent flow-rate is calculated and either the detergent feed time is modified for the current detergent feed cycle or it will be used for the next detergent feed time calculation. This allows the controller to avoid any on-off type proportioning, and instead use derivative control to achieve the detergent concentration setpoint quickly and with minimal overshoot. It also inherently gives the controller 12 the capability to optimize detergent feed for any of a variety of configurations and system lags without the need to predict them in advance. This learning and comparing cycle is performed each time the controller 12 activates a solenoid valve 6, thus allowing a change to the controller 12 response function if and when conditions change, such as water pressure or temperature. The special challenges in the warewashing application require the controller 12 to make up wide differences between the actual detergent concentration 28 provided by the sensor 24 and set-point as quickly as possible, again without exceeding set-point. Aggravating the process is a latency time between activating the detergent feed and reading the detergent concentration information 28 at the wash tank sensor 24. The detergent feed rate can vary greatly and must be compensated for.

The controller 12 first reads an interrupt condition 50, FLAG 3. FLAG 3 is an indication for the controller 12 to activate the solenoid valve 6 to allow the feeding of detergent solution 30 into the wash tank 40. If FLAG 3 has not been set, then the controller 12 is in the "control" state and the intermediate flow-rate calculation 60 begins immediately. If FLAG 3 has been set, then the controller 12 determines whether the solenoid valve 6 will be activated for longer than 2 seconds 52, given the last known flow-rate (FC), the current detergent concentration (DC) and set-point (DS). If the detergent feed will not be ON longer than 2 seconds, then the controller 12 does nothing 54. If the controller 12 determines that the solenoid valve 6 will be activated for longer than 2 seconds, the controller 12 initiates the output (Detergent Feed) and FLAG 3 is cleared 56. An output ON time (SET-TIME) is then calculated 58.

Next, the intermediate flow-rate calculation is initiated 60. If the controller 12 determines that the flow-rate has increased to the point where overshoot occurs, then the detergent feed is terminated 62. If the flow-rate has not increased, the accumulated ON time (Ta) is incremented 64 and compared with the SET-TIME 66. If the accumulated ON time is not greater than the SET-TIME, then the flow-rate calculation continues. However, if the accumulated ON time is greater than the SET-TIME, the detergent feed is terminated 62. Whenever the detergent feed is terminated in the above steps 62, the OFF-TIME timer (To) is incremented 68 and the controller 12 determines whether the flow-rate should continue to be calculated 70 by determining whether FLAG 2 has been set. If FLAG 2 has not been set, the flow-rate calculation continues 72. Otherwise, the remaining OFF-TIME is compared to the latency time as discussed below 90. When the flow-rate calculation is resumed 72, the detergent concentration 28 is read every 0.1 seconds. The value of the detergent concentration 28 is then stored in a memory location indicated by a pointer A 72. The pointer A is then incremented to the next memory location so that the number of stored detergent concentration 28 values can be counted 74. Once thirteen detergent concentration 28 values have been stored (A>12), then an intermediate flow-rate (Fco) is calculated 76. If Fco has not exceeded 35 microsiemens per second or FLAG 1 is not set 78, the flow-rate is deemed to have not changed and the latency time (LT) is incremented 80. The maximum latency time permitted is 20 seconds. If the output is ON and some latency time has accumulated, but not exceeding 20 seconds 82, then intermediate flow-rate calculation is repeated (back to 60). If the flow-rate is deemed to have changed or if the latency time is greater than 20 seconds, the flow-rate is set to the latest flow-rate 84 and FLAG 1 is set to stop accumulating latency time. With the output OFF, the latency time (LT) and flow-rate (FC) calculations continue if there are more than 2 seconds of OFF-TIME (To) remaining 86 and the OFF-TIME is not greater than the latency time 90. If there are not more than 2 seconds of OFF-TIME remaining 86, then FLAG 2 is set 88. If the OFF-TIME is greater than the latency time 90, the flow-rate is cleared 92. The accumulated on-time, off-time, the storage device, FLAG 1, and FLAG 2 are also cleared 92. The latency time is then reset to one 94. Finally, FLAG 3 is set 96 and recalculation begins again 52 by determining if the detergent feed will be on longer than two seconds, given the last know flow-rate (FC), the current detergent concentration (DC) and set-point (DS).

In summary, the present invention is a detergent controller having the ability to change the detergent concentration set-point to correspond to meal periods, as well as weekend and holiday workloads. The invention incorporates a microprocessor, a clock and controller in one unit. Thus, in addition to detecting and recording warewashing machines performance data, the unit can be programmed to control different set-points at different time settings. The present invention also controls detergent levels by balancing overshoot of the detergent set-point with the need to reach a suitable detergent concentration quickly. By optimizing the detergent concentration level without incurring overshoot, the controller insures adequate washing performance on the first items through the process, and reduces chemical feeder wear.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Those skilled in the art will recognize that the present invention could be used with different components or combinations of components than those described above. Those skilled in the art will also recognize that other user interfaces and storage devices and different combinations thereof, could be substituted for the interfaces and storage devices used in the preferred embodiment.

What is claimed is:

1. An apparatus for controlling variable detergent concentration levels in a warewashing machine, comprising:
   data entry means for entering a plurality of time settings and detergent concentration set-point values corresponding thereto;
   timer means for providing a real-time clock signal;
   processing means for receiving the time settings, corresponding detergent concentration set-point values, and real-time clock signal, and for comparing the real-time clock signal with the time settings and outputting the corresponding detergent concentration set-point value;
   sensor means for measuring a detergent concentration level of a wash tank solution;
   controller means for receiving and comparing the outputted detergent concentration set-point value from the processing means and the measured detergent concentration level from the sensor means, and for generating a signal to control the detergent concentration level in the wash tank solution in response thereto; and
   means for regulating a detergent feed on-time based on the comparison of the detergent concentration level to the detergent concentration set-point value.

2. The apparatus of claim 1, wherein each detergent concentration set-point value comprises a desired conductivity value based upon a type of soil expected for a particular time setting.

3. The apparatus of claim 1, wherein each time setting comprises a date and time.

4. The apparatus of claim 1, wherein the data entry means comprises a keypad and a display.

5. The apparatus of claim 1, wherein the sensor means further comprises means for sending signals based upon a conductivity of the wash tank solution to the processing means.

6. The apparatus of claim 5, wherein the processing means further comprises means for detecting wash tank changeovers, detergent feed, and detergent consumption based upon the conductivity signals received from the sensor means.

7. The apparatus of claim 1, wherein the sensor means further comprises means for sending signals based upon a temperature of the wash tank solution to the processing means.

8. A method of varying detergent concentration levels in a warewashing machine, comprising the steps of:
   entering a plurality of time settings and detergent concentration set-point values corresponding thereto;
   providing a real-time clock signal;
   comparing the real-time clock signal with the time settings and outputting the corresponding detergent concentration set-point value;
   measuring a detergent concentration level of a wash tank solution;
   receiving and comparing the outputted detergent concentration set-point value and the measured detergent concentration level, and generating a signal to control the detergent concentration level in the wash tank solution in response thereto; and
   regulating a detergent feed on-time based on the comparison of the detergent concentration level to the detergent concentration set-point value.

9. The method of claim 8, wherein each detergent concentration set-point value is a desired conductivity value based upon a type of soil expected for a particular time setting.

10. The method of claim 8, wherein the step of entering each time setting further comprises the step of entering a date and time.

11. The method of claim 8, further comprising the step of detecting wash tank changeovers, detergent feed, and detergent consumption based upon a conductivity of the wash tank solution.

* * * * *

UNITED STATES PATENT AND TRADEMARK OFFICE
CERTIFICATE OF CORRECTION

PATENT NO. : 5,404,893

DATED : April 11, 1995

INVENTOR(S) : Daniel F. Brady, et al.

It is certified that error appears in the above-identified patent and that said Letters Patent is hereby corrected as shown below:

In column 6, lines 34 and 35, "settlings" should read --settings--.

Signed and Sealed this

Fifth Day of September, 1995

Attest:

BRUCE LEHMAN

Attesting Officer

Commissioner of Patents and Trademarks